United States Patent [19]

Rubel

[11] Patent Number: 5,401,088
[45] Date of Patent: Mar. 28, 1995

[54] TRACTION ASSEMBLY FOR A FLEXIBLE TRACK

[76] Inventor: Edward R. Rubel, 68 S. Landing Rd., Rochester, N.Y. 14610

[21] Appl. No.: 120,942

[22] Filed: Sep. 14, 1993

Related U.S. Application Data

[63] Continuation-in-part of Ser. No. 983,416, Nov. 30, 1992, Pat. No. 5,273,351, which is a continuation of Ser. No. 723,331, Jun. 28, 1991, Pat. No. 5,188,441.

[51] Int. Cl.6 .............................................. B62D 55/26
[52] U.S. Cl. .................... 305/54; 305/35 EB
[58] Field of Search ................ 305/24, 35 R, 35 EB, 305/39, 54; 411/185, 186, 187, 189, 155, 156, 160, 544

[56] References Cited

U.S. PATENT DOCUMENTS

| | | |
|---|---|---|
| 2,096,041 | 10/1937 | Hosking . |
| 2,426,974 | 9/1947 | Ragon . |
| 3,572,851 | 3/1971 | Schuler . |
| 3,767,275 | 10/1973 | Russ, Sr. . |
| 3,782,787 | 1/1974 | Rubel et al. .................. 305/54 X |
| 3,785,420 | 1/1974 | Bradley et al. . |
| 3,838,894 | 10/1974 | Reedy ............................ 305/54 X |
| 3,865,441 | 2/1975 | Jolliffe . |
| 3,930,689 | 1/1976 | Maki . |
| 3,973,808 | 8/1976 | Janssen et al. ................. 305/54 |
| 4,059,315 | 11/1977 | Jolliffe et al. . |
| 4,095,849 | 6/1978 | Husted . |
| 4,218,101 | 8/1978 | Thompson . |
| 4,322,193 | 3/1992 | Stahl . |
| 5,033,801 | 7/1991 | Beeley ............................. 305/54 |
| 5,234,266 | 8/1993 | Musselman et al. ............ 305/54 |

FOREIGN PATENT DOCUMENTS

| | | |
|---|---|---|
| 1156224 | 8/1956 | France . |
| 464814 | 8/1928 | Germany ......................... 305/54 |
| 0143943 | 9/1980 | Germany . |

OTHER PUBLICATIONS

Stafast, Products The Right Connection, showing T-Nuts, Small Flange.

Primary Examiner—Russell D. Stormer
Attorney, Agent, or Firm—Cumpston & Shaw

[57] ABSTRACT

A traction assembly including a directional backing plate and threaded nut for securing a traction device relative to a flexible rotatable track. The backing plate and nut define curvilinear peripheries defined by a major axis and a minor axis, wherein the major axis is greater than the minor axis. The backing plate and T-nut cooperatively engage the stud relative to the track, such that the major axis is substantially perpendicular to the direction of rotation of the track, and the minor axis is substantially parallel to the direction of rotation. One of the T-nut and the backing plate include prongs for partially penetrating the track in the region of the traction assembly.

13 Claims, 8 Drawing Sheets

TRACTION ASSEMBLY FOR A FLEXIBLE TRACK

This is a continuation-in-part of application(s) Ser. No. 07/983,416, filed on Nov. 30, 1992, issued as U.S. Pat. No. 5,273,341, and which is a continuation of U.S. Ser. No. 07/723,331, Jan. 28, 1991, issued as U.S. Pat. No. 5,188,441.

The present invention relates to fasteners, and more particularly to a directional fastener assembly for affixing a traction stud to a flexible rotatable track.

BACKGROUND OF THE INVENTION

Vehicles driven over adverse riding surfaces, such as snow, ice, or mud employ traction devices to improve operating performances. The traction devices include a substantially cylindrical stud having either a conical or wedge shaped bit. The conical bit defines a circular cone having a circular cross section transverse to the direction of penetration into the riding surface. The tip of the cone penetrates the riding surface to improve traction. The wedge shaped bit defines a planar wedge which penetrates the riding surface to improve traction.

The bit is either affixed to the stud or integrally formed with the stud. The stud includes a threaded portion and a peripheral flange defining wrench flats.

A washer and T-nut are used to affix the stud to the track. The washers have either a circular or a square periphery. The washer includes a concentric aperture sized to receive the cylindrical portion of the stud. The portion of the washer adjacent the aperture is convex forming a domed portion defined by a spherical radius of approximately 2 to 3 inches. The T-nut is a planar circular piece having a threaded sleeve projecting from one side. Three prongs extend from the same side. The prongs are equally spaced approximately 120° apart about the periphery. The stud is passed through the washer so that the wrench flats contact the convex side of the washer. The threaded portion of the stud is then disposed through an aperture in the track so that the threaded portion extends towards the inside of the track. The T-nut engages the stud and draws the wrench flats against the washer, thereby drawing the washer against the track, and the prongs of the T-nut into the back side of the track.

Due to the tremendous forces exerted upon the traction device, it is desirable to have the contact area between the washer, T-nut, and the track as large as possible. The large surface area minimizes damage to the track as forces are exerted on the traction device. However, the large contact surface area has specific drawbacks. The edges of the large surface area introduce excessive wear as the track passes over the idler wheels. The flexing of the track over the idler wheels causes the edges of the washer and T-nut gouge the track. Therefore, there are benefits to reducing the contact area. In addition, as the T-nut rotates past the idler wheels, the prongs temporarily disengage the track, and then re-engage as the T-nut passes beyond the idler wheel. The repeated withdrawal and insertion of the prongs into the track locally weakens the track.

In an attempt to provide a balance between increased contact area and track wear, transverse cleats have been used across the width of the track. The cleats extend perpendicular to the direction of rotation. A plurality of traction devices may be cooperatively engaged with the track along the width of the track. However, the cleats require a plurality of traction devices, and add significant weight to the track which weight also introduces extra wear.

Traditionally, the tracks have included a plurality of longitudinal reinforcing fibers extending along the direction of track, or belt travel. The reinforcing fibers provide additional strength to the track. However, the fibers increase the resistance of the track to rotation, thereby increasing horsepower requirements.

New track constructions are formed without the longitudinal reinforcing fibers. The lack of fibers reduces rolling resistance and horsepower requirements. However, without the longitudinal fibers, the aperture in the track through which the stud, or shaft of the traction device passes tends to substantially deform. The deformation may be sufficient to permit one of the inner plate (T-nut) or outer plate (washer, backing plate) to pass through the deformed aperture, thereby causing complete failure of the traction assembly. Therefore, a need exists for precluding catastrophic deformation of the aperture.

SUMMARY OF THE INVENTION

The present invention includes a directional fastener assembly having a directional backing plate and directional T-nut for providing increased contact area between the traction device and the track, while minimizing the resistance to rotation and track degradation.

Preferably, the backing plate has an obround configuration and includes a concave surface having a larger radius of curvature than the washers of prior art. The obround configuration is defined by a major axis and a minor perpendicular axis, wherein the major axis is longer than the minor axis.

The backing plate cooperates with the directional T-nut to retain the traction device relative to the track. The T-nut is defined by a non-circular curvilinear periphery, having a major axis and a perpendicular minor axis such that the major axis is greater than the minor axis. The directional backing plate and T-nut cooperate to affix a stud relative to the track, such that the major axis of the T-nut and backing plate are substantially perpendicular to the direction of rotation of the track, and the minor axes are substantially parallel to the direction of rotation.

The fastener assembly provides a reduced length of contact with the track in the direction of rotation, thereby reducing the amount of cutting into the track by the edges of the backing plate and the T-nut. The fastener assembly also provides an increased contact area perpendicular to the direction of rotation, thereby distributing forces over a larger area to reduce wear on the track.

In an embodiment for reducing deformation of the track in the region of the traction assembly, and specifically the aperture through the track, the alternative embodiment includes prongs on the outer plate for engaging the outer surface of the track. The prongs are preferably located so that the aperture in the track is intermediate of the prongs. Specifically, a line connecting the prongs is perpendicular to the direction of travel of the track.

DETAILED DESCRIPTION OF A PREFERRED EMBODIMENT

Figure 1:
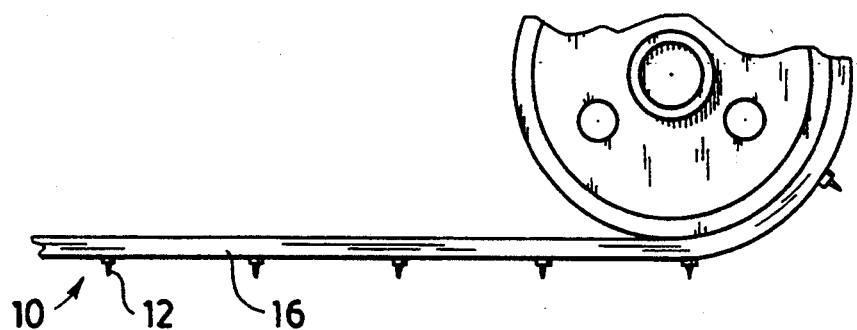
FIG. 1 is a partial side elevational view of the first embodiment of the fastener assembly in an operating environment.
Figure 2:
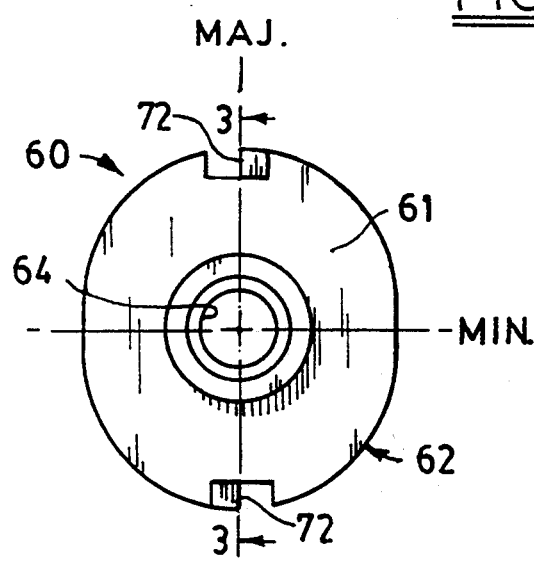
FIG. 2 is a bottom plan view of the first embodiment of the directional T-nut showing the obround periphery.
Figure 3:
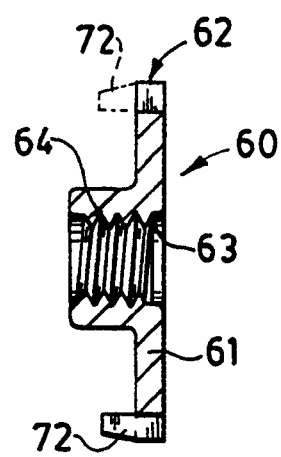
FIG. 3 is a cross-sectional view taken along lines 3—3 of FIG. 2.
Figure 6:
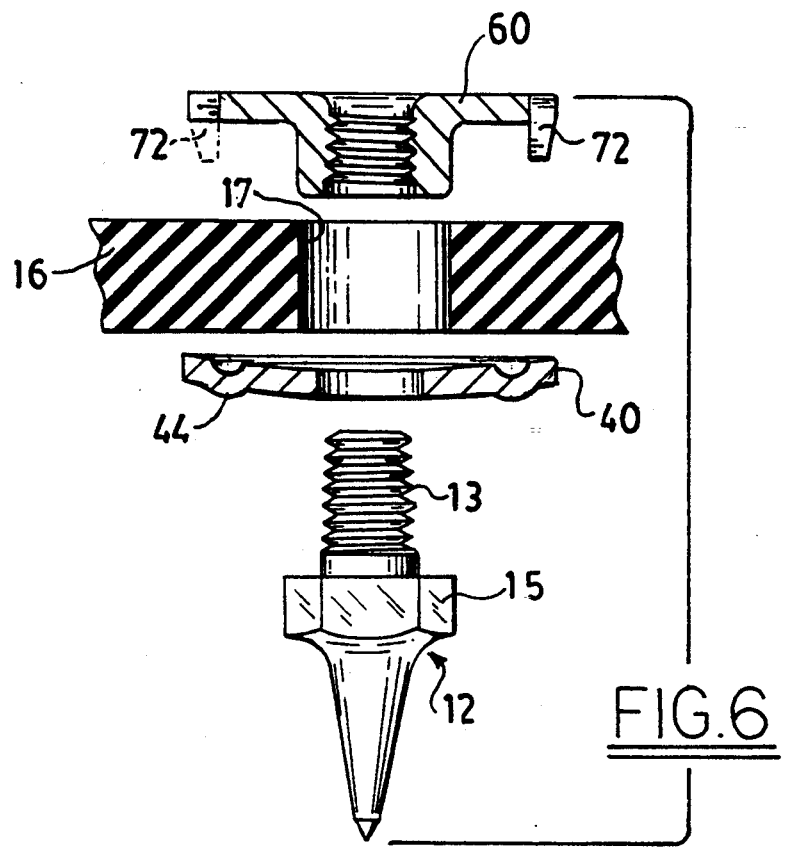
FIG. 6 is an exploded partial cross-sectional view of the first embodiment of the directional fastener assembly relative to a flexible track.
Figure 7:
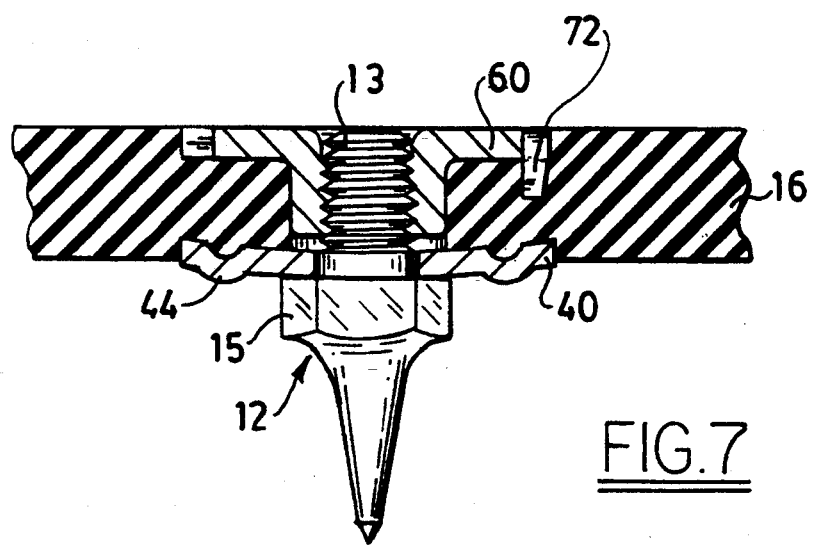
FIG. 7 is a partial cross-sectional view of a first embodiment of the directional fastener assembly cooperatively engaging a traction device and a flexible track.

Referring to FIG. 1, the directional fastener assembly 10 of the present invention retains a traction stud 12 relative to a rotatably flexible track 16. As shown in FIGS. 6 and 7, the traction stud includes a threaded portion 13 and peripheral wrench flats 15. The fastener assembly 10 includes a directional backing plate 40 and directional T-nut 60.

Figure 4:
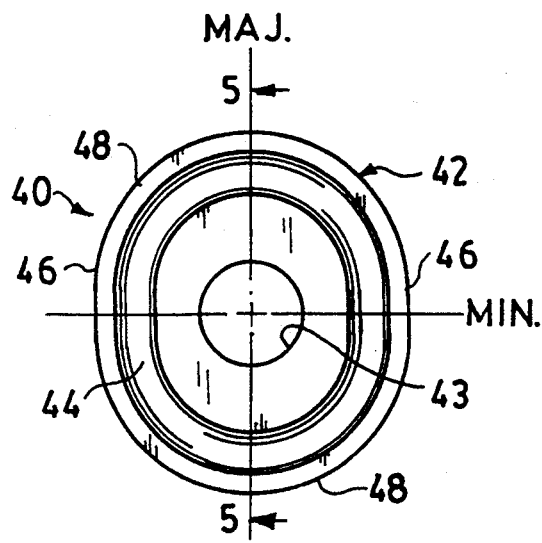
FIG. 4 is a top plan view of the first embodiment of the directional backing plate.
Figure 5:
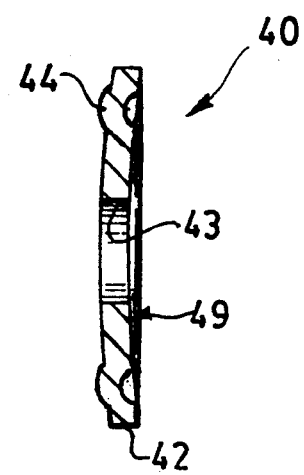
FIG. 5 is a cross-sectional view taken along lines 4—4 of FIG. 5.

Referring to FIGS. 4 and 5, the backing plate 40 is defined by a curvilinear noncircular periphery 42. The periphery 42 may be substantially oval, and is defined by a major axis MAJ and a perpendicular minor axis MIN, wherein the major axis is longer than the minor axis. The backing plate 40 defines an obround periphery 42, that is, having the form of a flattened cylinder having parallel sides 46 and semicircular ends 48. Preferably, the parallel sides 46 extend parallel to the major axis MAJ for a length of 1/16" to ¼" with a preferred length of approximately ⅛". The parallel sides 46 are connected by the semicircular curved ends 48 having by a radius of approximately ⅜" to ⅝" with a preferred radius of approximately ½".

Each of the sides 46 are of equal length, and each of the curved ends 48 are of equal length, such that the sides are interconnected by the curved semicircular ends. Preferably, the parallel sides 46 define approximately 2/25 the periphery of the backing plate 40, wherein the ratio of minor axis MIN to major axis MAJ is from approximately 4:5 to 19:20 with a preferred ratio of approximately 8:9. That is, the minor axis has a length from approximately 80% to approximately 95% of the major axis. The backing plate 40 includes a central aperture 43 having a diameter sufficient to receive the specific traction device employed with the fastener assembly. The diameter of the central aperture 43 may be from approximately ¼" to 5/16" with a preferred diameter of 17/64".

The backing plate 40 includes a circumscribing rib 44 set back from the periphery by approximately 0.06". The rib 44 defines a convex surface having a cross section transverse to the longitudinal dimension of approximately 0.12".

The backing plate 40 defines a concave surface 49 within the area of the rib 44, wherein the surface 49 is defined by a radius of curvature of approximately 4 to 10 inches. The concavity functions to bias the threads of the stud 12 against the threads of the T-nut 60 when cooperatively engaged with the track 16. The increased radius of curvature reduces the amount of dome, or concavity, thereby increasing the effective contact area between the backing plate 40 and the track 16 for the given periphery of the backing plate. The increased effective contact area distributes the clamping pressure over a larger area to minimize damage to the track 16. Preferably, the backing plate 40 is formed of heat treated 1070 spring steel.

Referring to FIGS. 2, 3, 6 and 7, the directional T-nut 60 includes a substantially planar member 61 defined by a noncircular curvilinear periphery 62. The periphery 62 may be substantially oval and specifically obround, defined by a major axis MAJ and a perpendicular minor axis MIN, wherein the major axis is greater than the minor axis. Preferably, the periphery 62 of the T-nut 60 satisfies the same ratio of minor axis MIN to major axis MAJ, as the backing plate 40, and the periphery 62 of the T-nut 60 is substantially coincident with the periphery 42 of the backing plate 40. That is, the periphery 62 of the T-nut 60 exhibits the same dimensions as the periphery 42 of the backing plate 40. However, the periphery of the T-nut may be less than or greater than the periphery of the backing plate, while having the same axes ratios.

The T-nut 60 includes a central aperture 63 sized to receive the cylindrical portion of the stud 12. The T-nut 60 includes a threaded sleeve 64 extending from the planar surface 61, concentric with the central aperture 63. The threaded sleeve 64 cooperatively engages the threaded portion of the stud 12. The outer diameter of the sleeve 64 is sized to be disposed within an aperture in the track.

A pair of depending prongs 72 extend from the planar surface 61 of the T-nut 60 in the same direction as the sleeve 64. The prongs 72 engage the track 16 to prevent rotation of the T-nut 60 relative to the track. Preferably, the prongs 72 are located at opposite ends of the major axis MAJ. As the prongs 72 will be colinearly aligned perpendicular to the direction of the track belt of rotation, the prongs are not forced to withdraw and reinsert into the track 16 each time the traction assembly passes the idler wheel.

Alternatively, the periphery of the backing plate to and T-nut 60 may comprise a plurality of linear segments (not shown) which define a noncircular substantially oval periphery wherein the dimension perpendicular to the direction of rotation is larger than the dimension parallel to the direction of rotation.

To employ the fastener assembly 10, an aperture 17 is formed in the track 16 in the desired location of the traction stud 12. The stud 12 is then disposed through the backing plate 40, such that the convex surface corresponding to the concave surface 49 of the backing plate contacts the peripheral flange formed by the wrench flats 15 on the stud. The backing plate 40 and stud 12 are then disposed relative to the track 16, such that the threaded portion 13 of the stud extends into the aperture 17. The concave surface 49 contacts the track 16.

Figure 9:
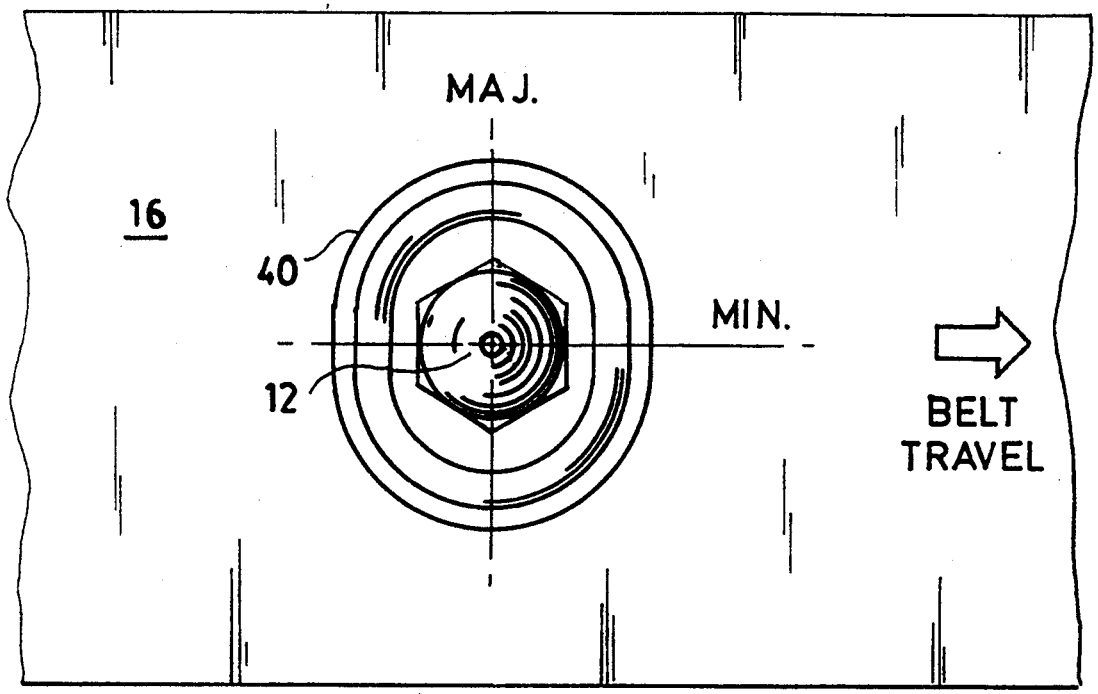
FIG. 9 is a bottom plan view of first embodiment of the directional fastener assembly for securing a threaded stud to a rotatable flexible track showing the major axis and the minor axis of the directional backing plate relative to the direction of belt travel.
Figure 10:
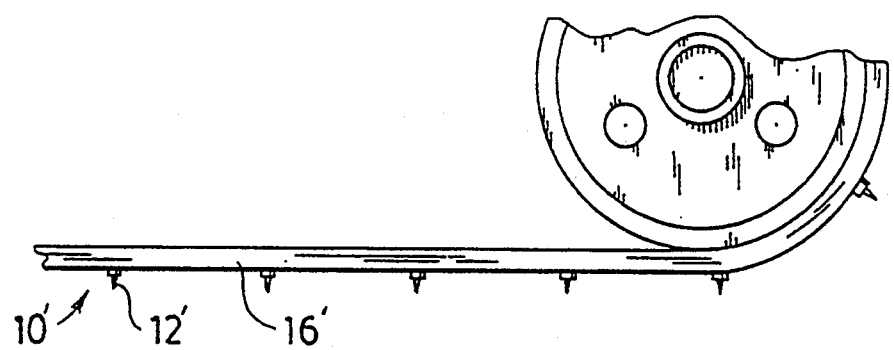
FIG. 10 is a partial side elevational view of the second embodiment of the fastener assembly in an operating environment.
Figure 11:
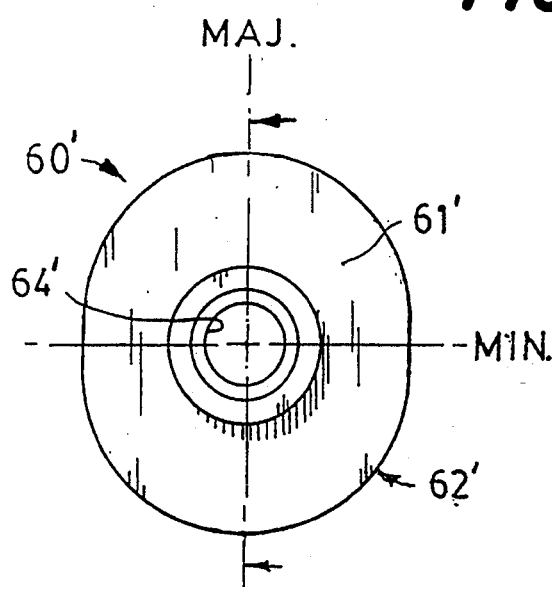
FIG. 11 is a bottom plan view of the T-nut or inner plate of the second embodiment.
Figure 12:
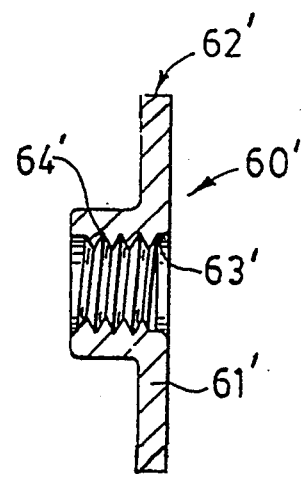
FIG. 12 is a cross-sectional view taken along lines 11—11 of FIG. 10.
Figure 13:
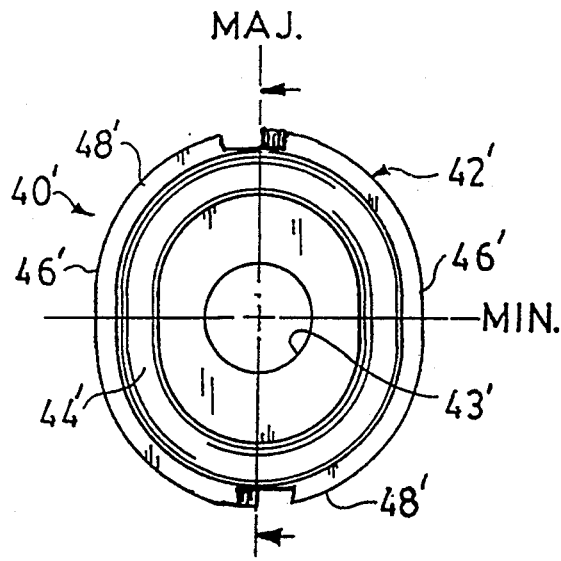
FIG. 13 is a top plan view of the backing plate or outer plate of the second embodiment.
Figure 14:
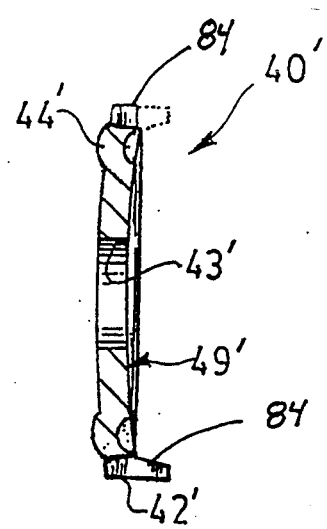
FIG. 14 is a cross-sectional view taken along lines 13—13 of FIG. 12.
Figure 15:
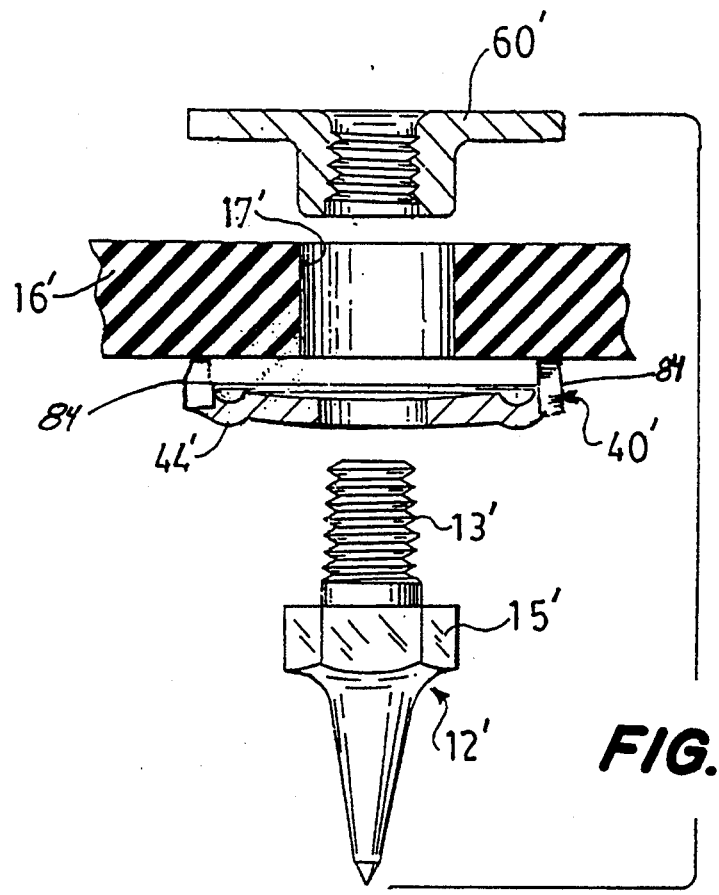
FIG. 15 is an exploded partial cross-sectional view of the second embodiment relative to a flexible track.
Figure 16:
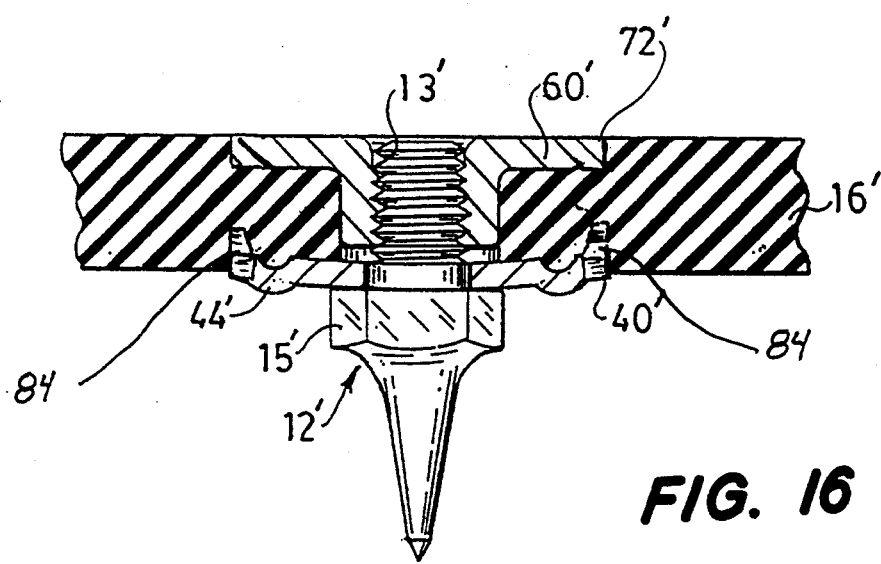
FIG. 16 is a partial cross-sectional view of the second embodiment cooperatively engaging the flexible track.
Figure 17:
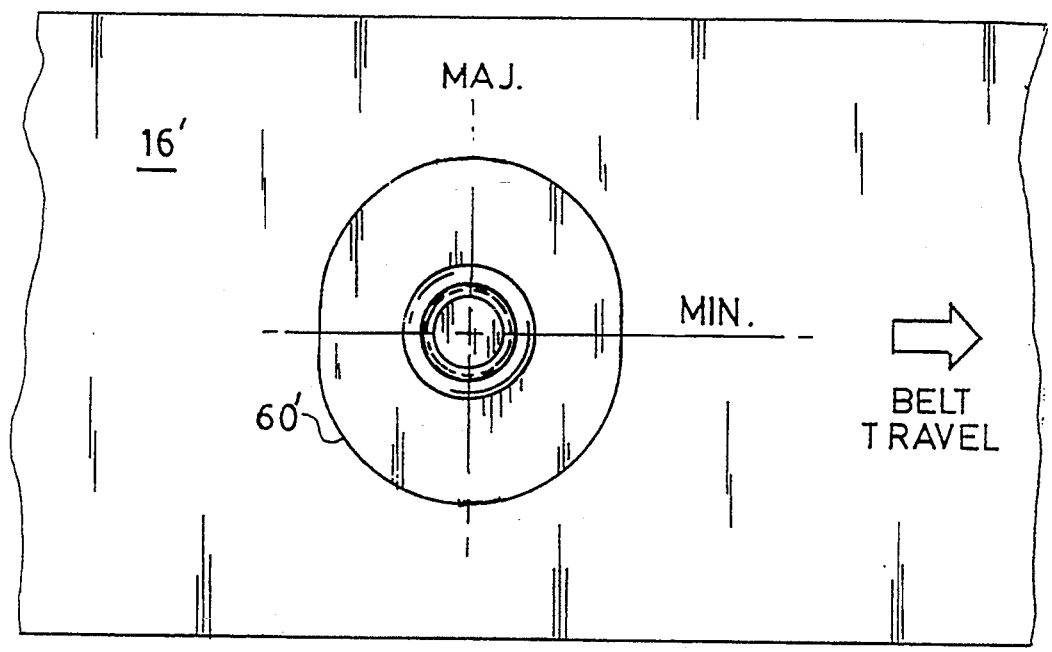
FIG. 17 is a top plan view of the second embodiment showing orientation of a major and minor axis relative to the direction of belt travel.
Figure 18:
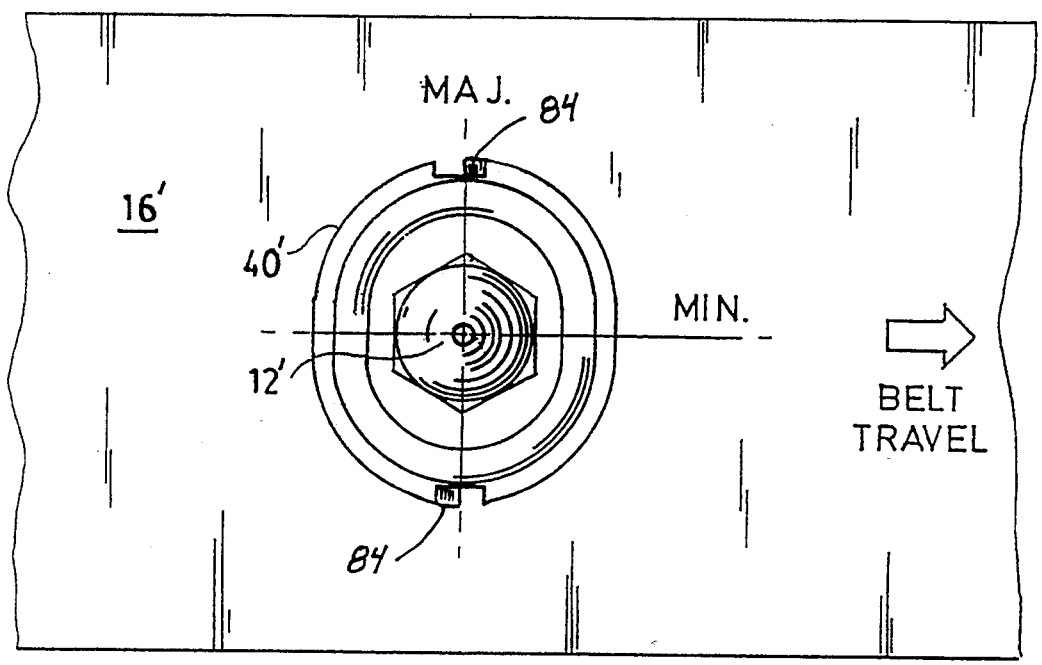
FIG. 18 is a bottom plan view of the second embodiment showing orientation of the major and minor axis of the backing plate to the direction of belt travel.
Figure 19:
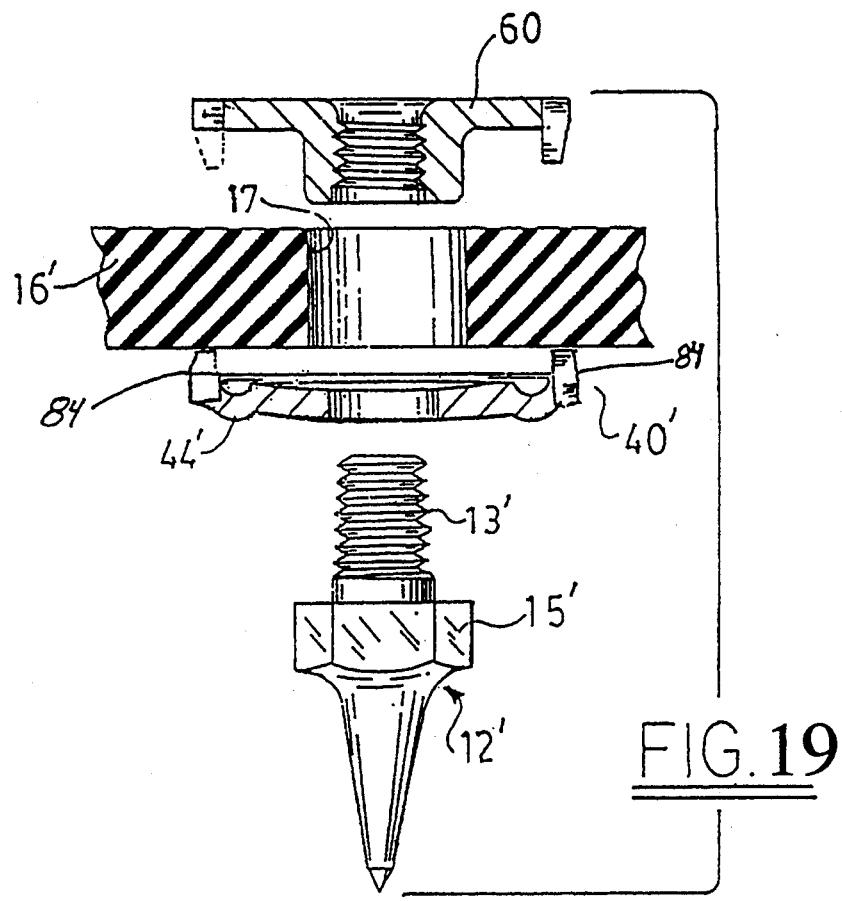
FIG. 19 is an exploded partial cross sectional view of the directional fastener assembly relative to a flexible track.
Figure 20:
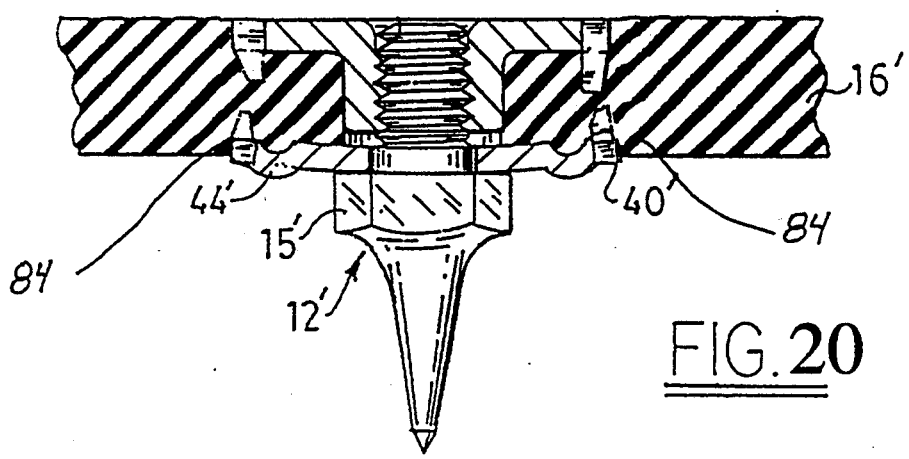
FIG. 20 is a partial cross sectional view of the directional fastener assembly cooperatively engaging a flexible track.
Figure 21:
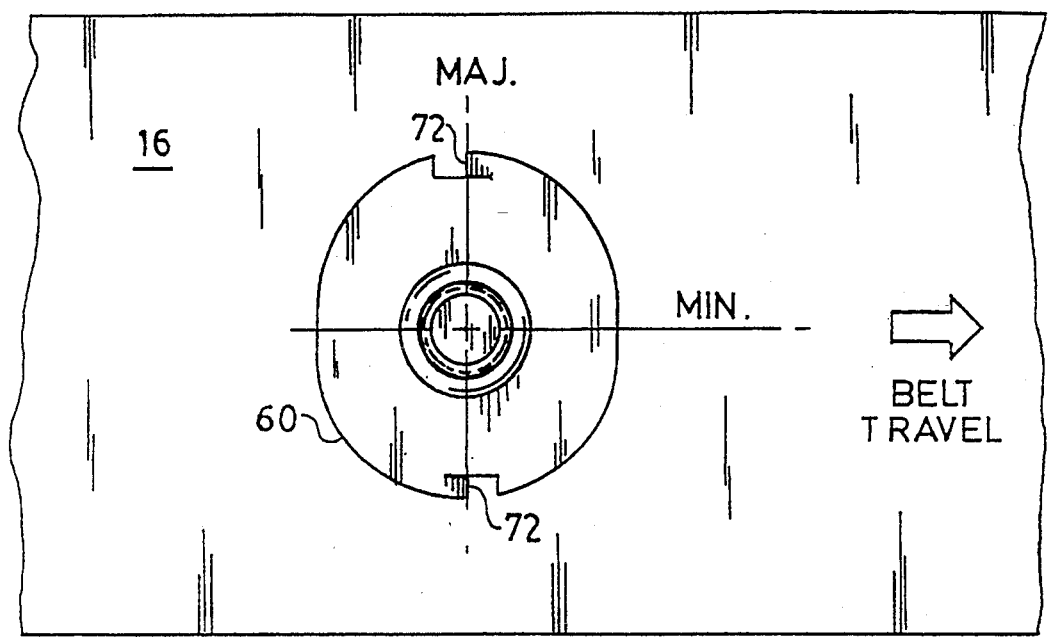
FIG. 21 is a top plan view of the directional assembly showing the orientation of the major axis and the minor axis relative to the direction of belt travel.
Figure 22:
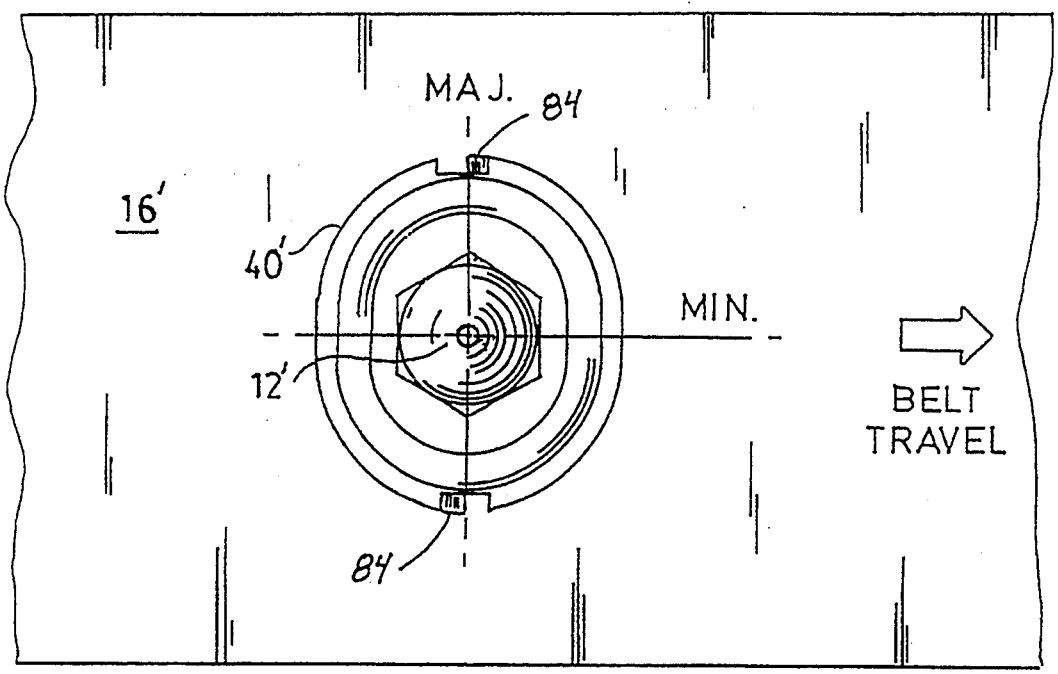
FIG. 22 is a bottom plan view of the directional fastener assembly showing the major axis and the minor axis relative to the direction of the belt travel.

As shown in FIG. 9, the backing plate 40 is aligned so that the major axis MAJ is substantially perpendicular to the direction of rotation of the track 16 and the minor axis MIN is substantially parallel to the direction of rotation. That is, the parallel sides 46 of the backing plate 40 are perpendicular to the direction of rotation of the track.

Figure 8:
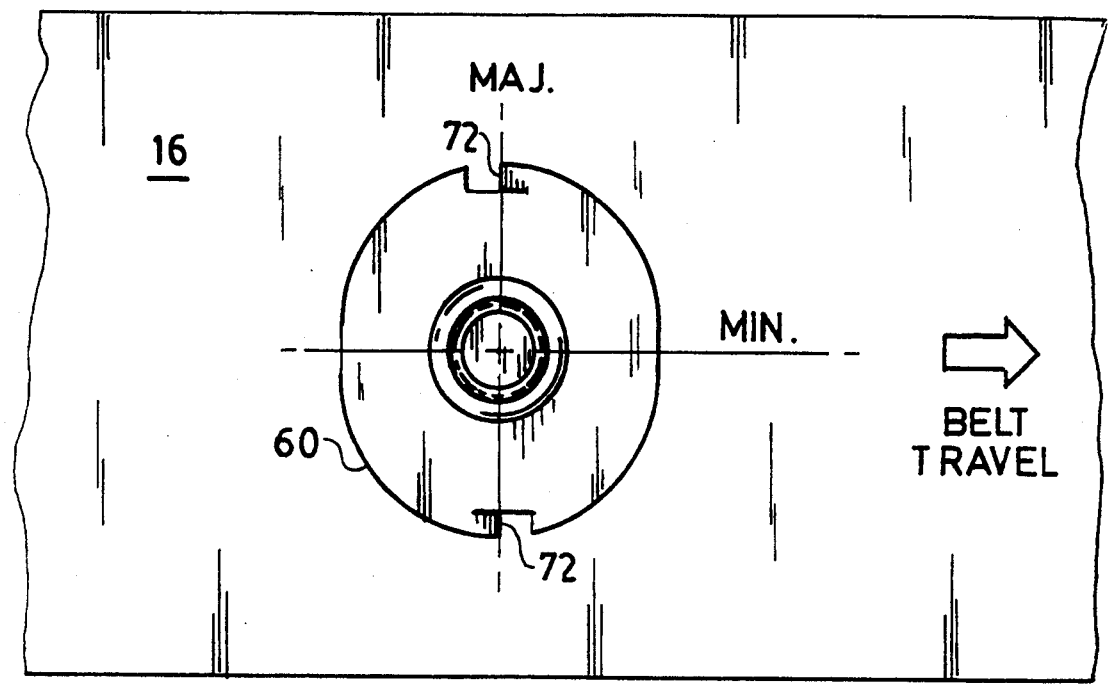
FIG. 8 is a top plan view of the first embodiment of the directional fastener assembly for securing a threaded stud to a rotatable flexible track showing the orientation of the major axis and the minor axis of the directional T-nut relative to the direction of belt travel.

The threaded sleeve 64 of the T-nut 60 engages the threaded portion 13 of the stud 12. As shown in FIG. 8, The T-nut 60 is pressed into the track 16 so that the prongs 72 engage the track, and the major axis MAJ is perpendicular to the direction of rotation and the minor axis MIN is parallel to the direction of rotation. The stud 12 is threaded into the T-nut 60, until the backing plate 40 and the T-nut 60 are substantially coplanar with the respective surfaces of the track.

The dimension of the contact area perpendicular to the direction of rotation distributes the clamping force over a relatively large area, and the lesser dimension of the area of contact parallel to the direction of rotation reduces wear induced by flexing or rotation of the track 16.

Preferably, the dimension of the contact area parallel to the axis of rotation corresponds to the diameter of the idler wheel so that upon rotation of the directional fastener assembly over the idler or drive wheel, the ends of the contact area parallel to the direction of rotation do not degrade the track. The dimension of contact between the fastener assembly and the track 16 perpendicular to the direction of rotation is greater than dimension of contact parallel to the direction of rotation.

The second embodiment is described in terms of corresponding components to the first embodiment. Common structure in the second embodiment is denoted by the same reference number as the first embodiment with a "prime" indicator, thus element 60 in the first embodiment is referenced as element 60' in the second embodiment. Therefore, a description of the common structure in the second embodiment is explicitly set forth.

The second embodiment is constructed for new track designs. Although the second embodiment is compatible with old tracks the second embodiment permits use of the traction assembly with new track designs. Typically, the rotatable tracks or belts 16' have included reinforcing strands (not shown) extending longitudinally, or parallel to the direction of the track rotation. These reinforcing threads may be formed of kevlar. The reinforcing threads increase the strength of the track. However, the threads increase the rolling resistance of the track 16' about its path and therefore, divert a portion of the available horsepower into overcoming the rolling resistance. A recent track development has produced tracks 16' without the longitudinal reinforcing members. These tracks exhibit a uniform strength in the direction of belt or track travel as well perpendicular to the direction of travel.

As previously stated, a portion of the traction assembly 10' extends through the aperture 17' in the track 16'. However, in the unreinforced tracks, the stresses on the traction assembly 10' tend to deform the aperture 17' and permit passage of the traction assembly through the track, thereby disengaging the traction assembly from the track.

The second embodiment includes at least one depending prong 84 extending from the outer or backing plate 40'. Upon application of two depending prongs 84, the prongs are aligned so that a line substantially intersecting the prongs is perpendicular to the direction of the belt travel. The prongs 84 project from the opposite side of the plate 40' than the rib 44'. Preferably, the prongs 84 extend a sufficient distance to penetrate the track to preclude deformation of the track in the region of the aperture, thereby precluding the outer plate 40' from passing through the aperture. Similarly, by preventing deformation of the area of the aperture, the inner plate 60' is precluded from passing through the track 16'. In this embodiment, the inner plate 60' may be formed with or without depending prongs 72. Therefore, both the inner plate 60' and the outer plate 40' may include projecting prongs.

In a preferred structure of the second embodiment, a pair of prongs 84 are located on the major axis MAJ, and project approximately 0.125 inches from the outer plate 40'. The prongs 84 are spaced apart so that the shaft of the traction assembly 10' and aperture 17' is intermediate of the prongs. The prongs may be formed by cutting and bending a portion of the outer plate 40' or may be separate components which are attached to the outer plate by welding or bonding.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A traction assembly for a continuous flexible rotating track, the track having an inner surface, an outer surface for contacting a support surface and an aperture extending from the inner surface to the outer surface, the traction assembly comprising:

(a) a shaft having a first end and a second end;

(b) an inner plate at the first end of the shaft, the inner plate having a surface for contacting the inner surface of the track; and (c) an outer plate contacting the shaft, the outer plate and the inner plate adapted to contact a portion of the track there between; the outer plate including a first prong and a second prong projecting from the outer plate to penetrate the outer surface of the track upon operable engagement of the assembly and the track;

the first and the second prong spaced apart to locate the aperture between the first and the second prong and sized to preclude a deformation of the aperture sufficient to permit passage of one of the inner and the outer plates through the aperture.

2. The traction assembly of claim 1, wherein the first and the second prongs are substantially colinear with the aperture.

3. The traction assembly of claim 1, wherein the inner plate is defined by a first dimension and a second longer dimension perpendicular to the first dimension and the inner plate is aligned with the direction of track rotation such that the second longer dimension is perpendicular to the direction of track rotation.

4. The traction assembly of claim 1, wherein the outer plate is defined by a first dimension and a second longer dimension perpendicular to the first dimension and the outer plate is aligned with the direction of track rotation such that the second longer dimension is perpendicular to the direction of track rotation.

5. A traction assembly for a continuous flexible rotating track, the track having an inner surface, and an outer surface for contacting a support surface, the traction assembly comprising:

(a) a shaft having a first end and a second end;

(b) an inner plate at the first end of the shaft, the inner plate having a surface for contacting the inner surface of the track; and (c) an outer plate contacting the shaft, the outer plate and the inner plate adapted to contact a portion of the track there between; the outer plate including a first and a second prong projecting a sufficient distance to penetrate the track upon operable engagement of the traction assembly to the track;

one of the inner plate and the outer plate defined by a first dimension and a second longer dimension perpendicular to the first dimension and aligned with a direction of track rotation such that the second longer dimension is perpendicular to the direction of track rotation.

6. The traction assembly of claim 5, wherein a line extending between the first prong and the second prong is substantially perpendicular to a direction of track travel.

7. The traction assembly of claim 5, wherein the inner plate includes a plurality of prongs for engaging the inner surface of the track.

8. The traction assembly of claim 5, wherein the inner plate is fixedly attached to the shaft.

9. The traction assembly of claim 5, wherein the shaft includes a threaded portion and the inner plate includes a plurality of threads for cooperatively engaging the threaded portion.

10. The traction assembly of claim 5, wherein the shaft includes a threaded portion and further comprising a threaded member for cooperatively engaging the threaded portion to retain the inner plate and the outer plate relative to the track.

11. A traction assembly for a continuous flexible rotating track, the track having an inner surface, an outer surface for contacting a support surface and an aperture extending from the inner surface to the outer surface, the traction assembly comprising:

(a) a traction stud;

(b) an inner plate connected to the stud for contacting the inner surface of the track; and (c) an outer plate connected to the stud for contacting the outer surface of the track to retain a portion of the track between the inner plate and the outer plate, the outer plate including a first prong for penetrating outer surface of the track;

the first prong sized and spaced apart from the aperture by a sufficient distance to preclude a deformation of the aperture sufficient to permit passage of one of the inner and the outer plates through the aperture.

12. The traction assembly of claim 11, wherein the outer plate includes a second prong spaced from the first prong to dispose the traction stud between the first prong and the second prong.

13. The traction assembly of claim 11, wherein the inner plate includes a prong for penetrating the inner surface of the track.

* * * * *